(12) United States Patent
Frank

(10) Patent No.: US 6,267,415 B1
(45) Date of Patent: Jul. 31, 2001

(54) DEVICE FOR ATTACHING A CORRUGATED TUBE TO A CONNECTION PIECE

(75) Inventor: Kurt Frank, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/214,365

(22) PCT Filed: Feb. 17, 1998

(86) PCT No.: PCT/DE98/00453

§ 371 Date: Jan. 4, 1999

§ 102(e) Date: Jan. 4, 1999

(87) PCT Pub. No.: WO98/55793

PCT Pub. Date: Dec. 10, 1998

(30) Foreign Application Priority Data

Jun. 4, 1997 (DE) .............................. 197 23 410

(51) Int. Cl.[7] .................................................. F16L 37/08
(52) U.S. Cl. ........................ 285/255; 285/257; 285/322
(58) Field of Search .................................. 285/903, 257, 285/243, 255, 252, 322

(56) References Cited

U.S. PATENT DOCUMENTS

| | | | |
|---|---|---|---|
| 921,079 | * 5/1909 | Burtscher | 285/257 |
| 2,314,000 | * 3/1943 | Lusher et al. | 285/257 |
| 3,589,752 | * 6/1971 | Spencer | 285/257 |
| 3,724,882 | * 4/1973 | Dehar | 285/255 |
| 3,751,076 | * 8/1973 | Thais et al. | 285/257 |
| 4,607,867 | * 8/1986 | Jansen | 285/257 |
| 4,705,304 | * 11/1987 | Matsuda et al. | 285/255 |
| 5,261,706 | * 11/1993 | Bartholomew | 285/255 |

FOREIGN PATENT DOCUMENTS

| | | | |
|---|---|---|---|
| 2904482 | * 8/1980 | (DE) | 285/255 |
| 42 24 981 A1 | 2/1994 | (DE) . | |
| 44 44854 A1 | 6/1996 | (DE) . | |
| 19231 | * 8/1915 | (GB) | 285/255 |
| 92/11484 | * 7/1992 | (WO) . | |

* cited by examiner

Primary Examiner—Eric K. Nicholson
(74) Attorney, Agent, or Firm—Michael J. Striker

(57) ABSTRACT

In connection with an arrangement for fastening a corrugated pipe (11) on an essentially hollow-cylindrical connector (12), at least one spring leg (15), which extends at a radial distance from and in a longitudinal direction to the connector (11) and has a retaining lug (18) radially projecting toward the latter, is formed on the connector (12), and an annularly-shaped clamping element (20) is placed on the outside around the corrugated pipe (11) pushed onto the connector (12), which generates a radial clamping force directed toward the corrugated pipe (11) on the at least one spring leg (15), for providing a dependable and simple connection technique (FIG. 2).

11 Claims, 2 Drawing Sheets

DEVICE FOR ATTACHING A CORRUGATED TUBE TO A CONNECTION PIECE

BACKGROUND OF THE INVENTION

The invention relates to an arrangement for fastening a corrugated pipe to an essentially hollow-cylindrical connector, in particular in connection with fuel-delivery units of motor vehicles.

Such corrugated pipes, which as a rule are flexible, are used in fuel-delivery units of motor vehicles as connecting lines between the pressure connector of an electric fuel pump integrated into a filter bowl and a connector formed in a tank flange for the delivery line leading to the internal combustion engine (DE 44 44 854 A1 or DE 42 24 981 A1). To achieve a pressure-resistant fastening between the connector and the corrugated pipe, the connector has a so-called Christmas tree profile on its exterior jacket there, onto which a specially shaped straight end element with auxiliary grooves cut therein is pushed. The shaped end element of the corrugated pipe is interlocked with the Christmas tree profile by means of the auxiliary grooves, so that the connection cannot be loosened even under delivery pressure.

SUMMARY OF THE INVENTION

In accordance with the present invention an arrangement for fastening a corrugated tube is proposed, which has a connector with spring legs and a clamping element generating a radial clamping force directed toward the corrugated pipe on the at least one spring leg, and the connector with the spring legs are formed of one piece on a flange of a fuel tank, while the connector constitutes a pipe section protruding from the tank flange.

The fastening arrangement in accordance with the invention of a corrugated pipe on a connector has the advantage that it is possible to omit both the Christmas tree profile on the connector, which is complicated from the viewpoint of injection molding technology, and also the special contact pressure geometry of an end element of the corrugated pipe. Because of this, the corrugated pipe can be produced without an end element in the form of a so-called "endless corrugated pipe", and can be cut to the required size during assembly. This entails cost advantages both in the manufacture and the storage of the corrugated pipe, which no longer needs to be stocked in different lengths and can now be stored in a rolled-up state as a space-saving roll. It is possible to produce the spring legs with retaining lugs on the connector by means of forced removal with cost-efficient plastic injection molding tools without elaborate transverse slides, so that a cost advantage in comparison with the Christmas tree profile also results here. As a whole, by means of the fastening arrangement in accordance with the invention a very cost-effective and qualitatively outstanding connection technique between the corrugated pipe and the connector is achieved, with the possibility of very simple and cost-saving disassembly when service is needed.

By means of the measures recited in the further claims, advantageous further developments and improvements of the measuring device disclosed in claim 1 are possible.

In a preferred embodiment of the invention, a seal ring in the form of an O-ring is inserted between the outer jacket of the connector and a crest of the corrugated pipe. The corrugated pipe is totally pressure sealed in respect to the exterior jacket of the connector by means of the annularly-shaped clamping element, which can be designed as a hose clamp, cable clamp or sliding sleeve and exerts a radially directed clamping force on the spring legs and, via their lugs, which engage the troughs of the corrugated pipe, on the corrugated pipe and the connector.

In accordance with an alternative embodiment of the invention, for forming the spring legs a ring, which surrounds the connector coaxially at a radial distance, is provided with longitudinal slits extending from a closed annular collar as far as the free front end of the ring. In this case the O-seal can also be inserted between the inner ring surface of the annular collar supporting the spring legs, which extend axially outward, and a trough of the corrugated pipe.

BRIEF DESCRIPTION OF THE DRAWINGS

The invention is described in greater detail in the following description by means of exemplary embodiments represented in he drawings. Shown are in.

DESCRIPTION OF THE PREFERRED EMBODIMENTS

Figure 1:
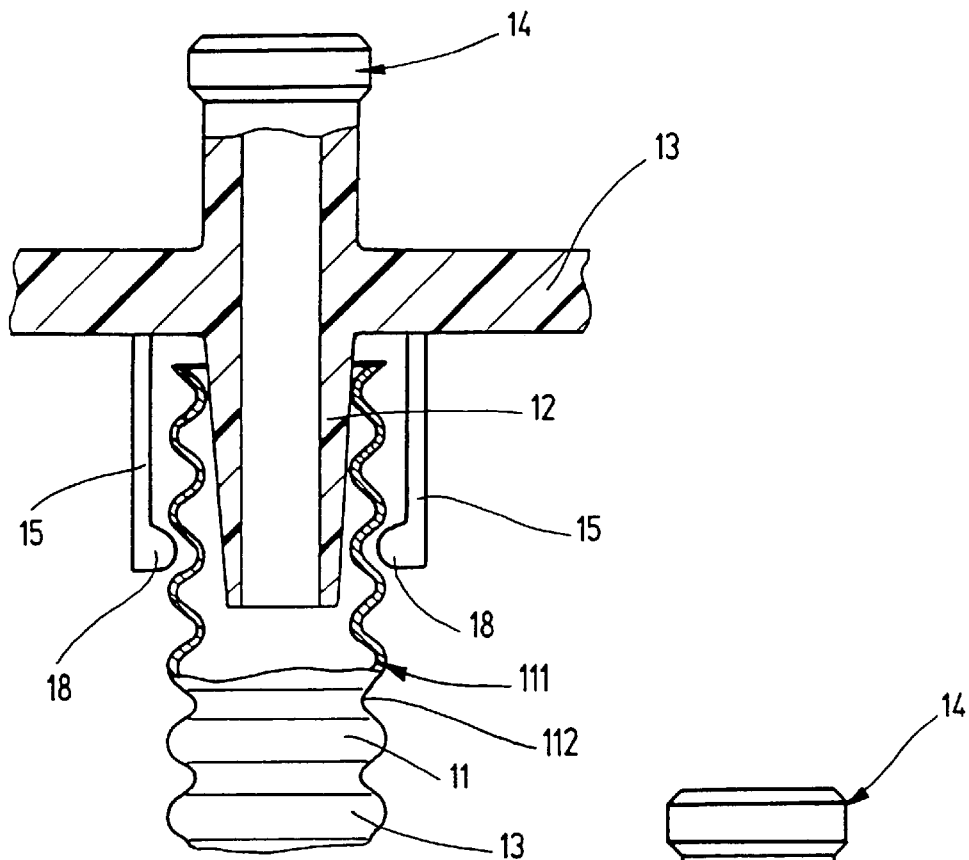
FIG. 1, by means of sections a fastening arrangement of a corrugated pipe on a partially cut connector at a time prior to the termination of assembly, FIG. 2, the same representation as in FIG. 1 after assembly has been finished.
Figure 2:
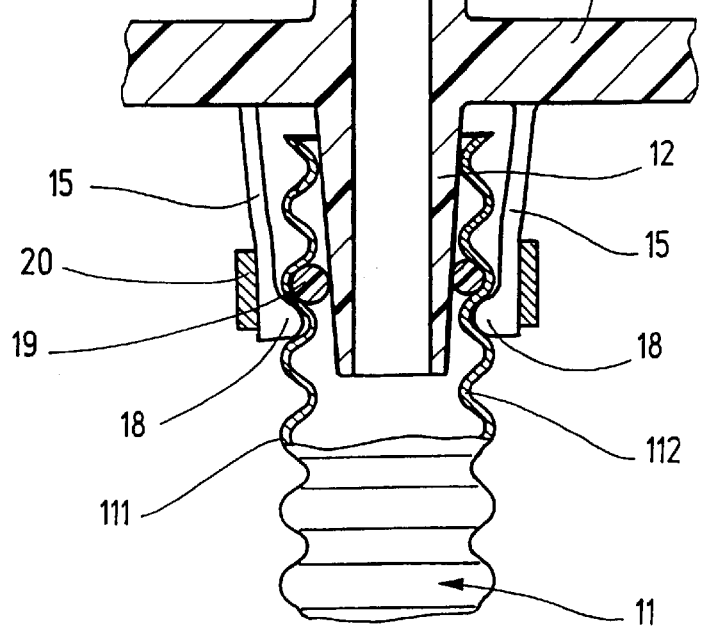

The fastening arrangement of a corrugated pipe 11 on a connector 12 represented in longitudinal section in FIGS. 1 and 2 is provided in a fuel delivery unit for motor vehicles such as described, for example, in DE 44 44 854 A1. The hollow-cylindrical connector 12 is made of one piece with a tank flange 13 of plastic, which is placed on the top of a fuel tank. Here, the hollow-cylindrical connector 12 constitutes the portion, extending into the interior of the tank, of a connection 14 for a fuel delivery line leading from the fuel tank to the internal combustion engine of a motor vehicle. The corrugated pipe 11 makes the connection with the pressure side of an electric fuel pump arranged in the fuel tank, and is connected there with the fuel pump. In a known manner, the flexible corrugated pipe has a multitude of successively arranged crests or rises 111 and troughs or depressions 112, which extend in an annular or helical form over the circumference of the corrugated pipe 11. For reasons of removal following the injection molding process of the tank flange 13, the hollow-cylindrical connector 12 can also be shaped slightly conically, as represented in FIGS. 1 to 4.

Figure 4:
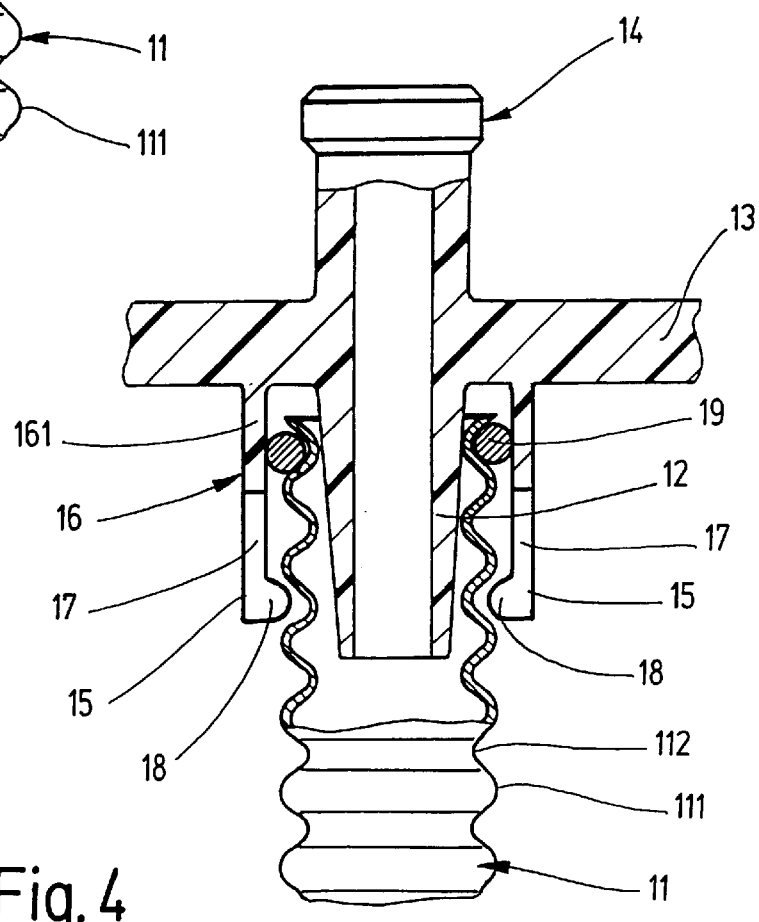

A plurality of spring legs 15, which are located offset in respect to each other on a graduated circle, is arranged at a radial distance from the connector 12 and essentially extends parallel with the connector axis and are formed as one piece on the connector 12, or respectively the tank flange 13. As in FIG. 1, these spring legs 15 can be made as individual elements, which project at right angles away from the interior surface of the tank flange 13, or they can also be provided in that—as represented in FIG. 4—a cylinder-shaped ring 16, which is formed on the tank flange 13 and coaxially encloses the connector 12, is provided with longitudinal slits 17, which start at the free end of the ring 16 and extend as far as a closed annular collar 161. All spring legs 15 have been made the same length and, at their free end, support retaining lugs 18 which project radially toward the connector 12 and are shaped in such a way that they are able to engage interlockingly to a large extent a trough 112 of the corrugated pipe 11. The retaining lugs 18 are made of one piece with the spring legs 15 and are already formed during the injection molding process of the tank flange 13, the same as the connector 12 and the spring legs 15.

To create a fastening arrangement, the corrugated pipe 11 is cut off in the required length from a coil of corrugated pipe and one end of it is pushed onto the connector 12. For the liquid-sealed connection of the fastening arrangement, an O-shaped seal ring 19 is inserted into a crest 111 in the interior of the corrugated pipe 11—as sketched in FIG. 2—and is pushed together with the corrugated pipe 11 onto the connector 12. Then a clamping element 20 is placed on the outside around the spring legs 15 and a radial clamping force is exerted on the spring legs 15 by means of the clamping element 20, because of which the retaining lugs 18 of the flexibly-elastic spring legs 15 dip into a trough 112 of the corrugated pipe 11 and press it against the exterior jacket of the connector 12. In this way the seal ring 19 is simultaneously frictionally clamped between the connector 12 and the corrugated pipe 11. The clamping element 20 can be designed in different ways, for example as a hose clamp or also a cable clamp. The finished fastening arrangement between the corrugated pipe 11 and the connector 12 is represented in FIG. 2. As can be seen without difficulty, the corrugated pipe 11 is fixed in place immovably and pressure-sealed by the spring legs 15 with their retaining lugs 18 by the action of the clamping element 20.

Figure 3:
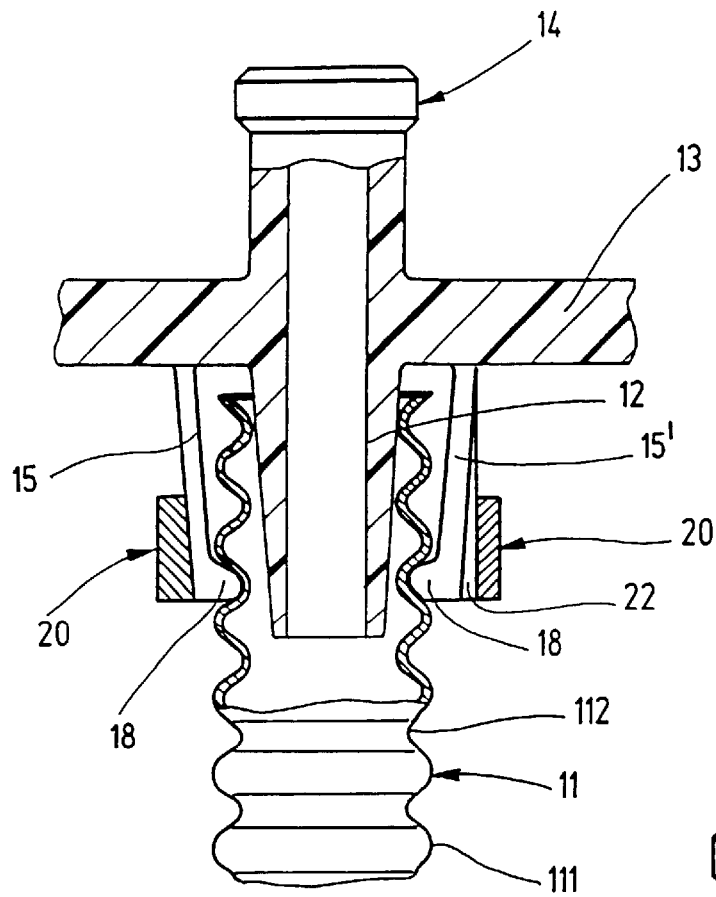
FIG. 3, the same representation as in FIG. 2 in accordance with two further, alternative exemplary embodiments, FIG. 4, the same representation as in FIG. 1 in accordance with a fourth exemplary embodiment.

In the two exemplary embodiments of the fastening arrangement between the corrugated pipe 11 and the connector 12 represented in FIG. 3 to the left and right of the connector axis, the annularly-shaped clamping element 20 is respectively embodied as a sliding sleeve 21, or respectively 21'. The sliding sleeve 21, which can be seen on the left in FIG. 3 has a clear cross section, which conically tapers in a direction opposite the slip-on direction, so that in the course of continuously being slipped on, the sliding sleeve 21 increasingly pushes the spring legs 15 in the direction toward the connector 12, so that their retaining lugs 18 dip into a trough 112 of the corrugated pipe 11 and clamp the corrugated pipe 11 to the connector 12 in a frictionally connected manner. In the exemplary embodiment of the sliding sleeve 21' represented to the right in FIG. 3, it does not have a conical, but a cylindrical inner ring surface. Here, the spring legs 15' are provided on their back facing away from the connector 12 with a wedge-shaped longitudinal rib 22, whose radial rib height increases in a direction opposite the slip-on direction. To slip the sliding sleeve 21' onto the spring legs 15', the latter must be manually pressed on the corrugated pipe 11 pushed on the connector 12 until the cylinder-shaped inner ring surface of the sliding sleeve 21' can be pushed past the longitudinal ribs 22.

For the liquid-sealed embodiment of the described fastening arrangement between the corrugated pipe 11 and the connector 12, the O-shaped seal ring 19 in an alternative exemplary embodiment in accordance with FIG. 4 is not arranged—as represented in FIG. 2—between the connector 12 and the corrugated pipe 11, but between the corrugated pipe 11 and the annular collar 161 of the ring 16, and is pressed in a frictionally connected manner in a trough 112 on the one side against the corrugated pipe 11, and on the other side against the cylindrical inner surface of the annular collar 161. The clamp-tightening element 20 to be pushed over the spring legs 15 is not represented in FIG. 4. It can be designed as a hose clamp or cable clamp, as in FIG. 2, or as a sliding sleeve, as in FIG. 3. In the same way as represented in FIGS. 2 and 3, the clamping element 20 presses the retaining lugs 20 on the spring legs 15 into a trough 112 of the corrugated pipe 11 and in the process simultaneously generates a radial contact pressure of the annular collar 161 against the seal ring 19.

What is claimed is:

1. An arrangement for fastening a corrugated pipe to an essentially hollow-cylindrical connector in fuel-delivery units of motor vehicles, the arrangement comprising a fuel tank having a flange at least one leg which extends in a radial direction and in a longitudinal direction in relation to said connector and has a retaining lug projecting radially toward said connector; an annularly-shaped clamping element placed on an outside around said at least one spring leg and around said corrugated pipe pushed onto said connector so as to generate a radial clamping force directed toward said corrugated pipe on said at least one spring leg, said connector and said spring legs with said retaining lugs being formed of one piece on said flang of said fuel tank, said connector constituting a pipe section protruding from said tank flange toward a tank interior for a fuel delivery line, said corrugated pipe forming a fuel delivery line of a fuel delivery unit of a motor vehicle and a component of the fastening arrangement.

2. An arrangement as defined in claim 1, wherein said corrugated pipe has a trough, said retaining lug being arranged on said at least one spring leg so that it substantially enters into said trough.

3. An arrangement as defined in claim 1, wherein the arrangement has a plurality of said spring legs respectively supporting a plurality of said retaining lugs which are arranged on a graduated circle coaxial with said connector and are offset from each other.

4. An arrangement as defined in claim 3, wherein said retaining lugs are offset from each other by same circumferential angles.

5. An arrangement as defined in claim 1, wherein said annularly-shaped clamping element is a hose clamp.

6. An arrangement as defined in claim 1, wherein said annularly-shaped clamping element is a sliding sleeve having a clear cross-section which conically tapers opposite to a slip-on direction.

7. An arrangement as defined in claim 6, wherein said annularly-shaped clamping element has a sliding sleeve with a cylindrical inner annular surface, said spring legs on their back facing away from said connector having a wedge-shaped longitudinal rib with a radial height increasing opposite to the slip-on direction.

8. An arrangement as defined in claim 1, and further comprising a seal ring located in a frictionally connected manner between an outer jacket of said connector and a crest of said corrugated pipe.

9. An arrangement as defined in claim 1, and further comprising a ring which coaxially surrounds said connector at a radial disk distance and is provided with longitudinal slits so as to form said spring legs, said longitudinal slits being offset in relation to each other and extending from a closed annular collar constituting a ring section to a free end of said ring.

10. An arrangement as defined in claim 9, wherein said longitudinal slits are offset in relation to each other by same circumferential angles.

11. An arrangement as defined in claim 10, and further comprising a seal ring located in a frictionally connected manner between an inner surface of said annular collar and a trough of said corrugated pipe.

* * * * *